Dec. 28, 1943.　　　　O. REDENBO　　　　2,337,769
PORTABLE POWER DRIVEN HACKSAW
Filed Oct. 21, 1941　　　　2 Sheets-Sheet 1
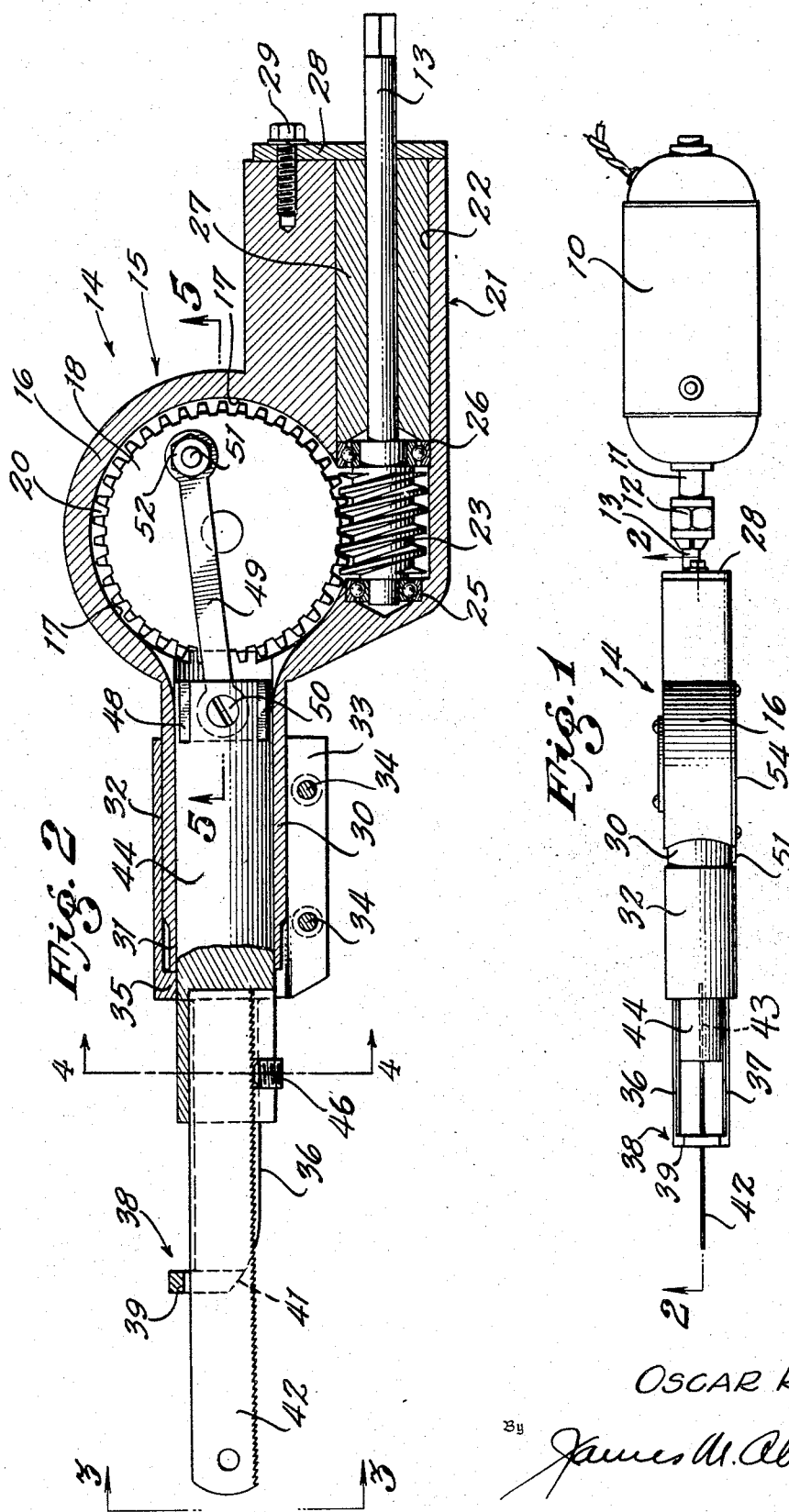
Inventor,
OSCAR REDENBO
By James M. Abbett
Attorney

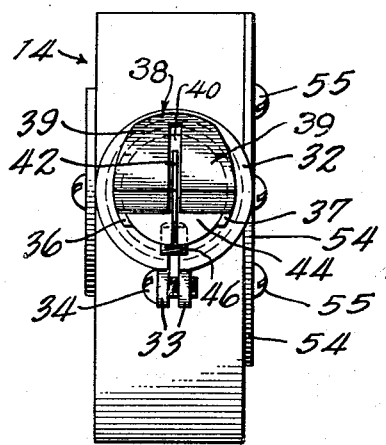
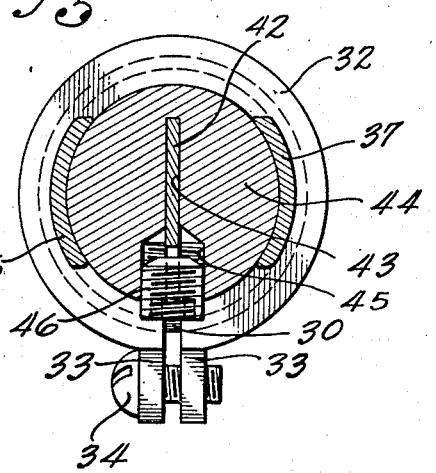
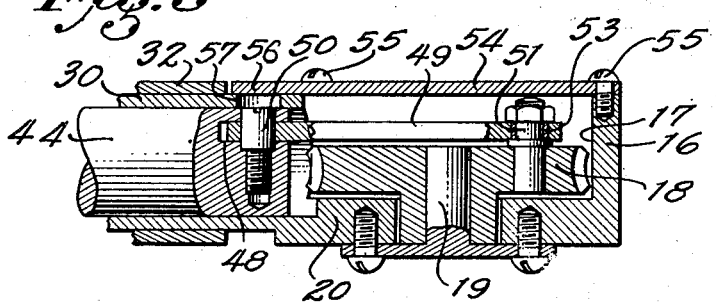

Patented Dec. 28, 1943

2,337,769

UNITED STATES PATENT OFFICE 2,337,769

PORTABLE POWER-DRIVEN HACK SAW

Oscar Redenbo, Los Angeles, Calif.

Application October 21, 1941, Serial No. 415,875

6 Claims. (Cl. 29—73)

This invention relates to a cutting tool and particularly pertains to a portable power driven hacksaw.

At the present time there is a demand for a cutting tool of the hacksaw type which is simple in construction, sufficiently light in weight to be portable, and easily handled. Such tools are required in airplane manufacture and other defense industries. The tools for the most part which have heretofore appeared on the market are relatively large and cumbersome and embody parts which are of large size, readily wear, and require the use of a large and heavy housing. It is the principal object of the present invention to provide a portable cutting tool which may be easily connected with a portable power driven unit not liable to wear, and which may be housed within a strong, rigid and light weight housing.

It is also an object of the present invention to provide a suitable gear reduction between the driving motor and the saw so that a relatively slow speed sawing action may take place without excessive chattering or vibration of the structure, thus making it possible for the device to be easily handled and manipulated to cut a kerf along a desired path.

The present invention contemplates the provision of a portable power driven hacksaw having a one-piece body housing within which a gear structure and a reciprocating driving head are mounted, the gears being of the worm gear type, the structure further carrying adjustable guide and depth limiting means and other novel features which will be hereinafter described.

The invention is illustrated by way of example in the accompanying drawing in which:

Figure 1 is a view in elevation showing the structure of the present invention and its connection to a portable motor driving unit.

Fig. 2 is an enlarged view in central vertical section through the portable motor driving unit as seen on the line 2—2 of Fig. 1.

Fig. 3 is an enlarged end view showing the hacksaw head as viewed in the direction of the arrows 3—3 in Fig. 2.

Fig. 4 is a view in transverse section through the operating end of the structure as seen on the line 4—4 of Fig. 2 and discloses the hacksaw mounting.

Fig. 5 is a fragmentary view in longitudinal section through the structure as seen on the line 5—5 of Fig. 2.

Referring more particularly to the drawings, 10 indicates a portable motor driving unit having a driving spindle 11 and carrying a chuck 12. The chuck receives the spindle 13 of a power hacksaw unit 14 and with which unit the present invention is concerned. It is to be understood that the invention does not involve the driving means, since any suitable driving means may be attached to the spindle 13 by a chuck.

The tool 14 is shown in detail in Fig. 2 of the drawings. Here it will be seen that a main housing 15 is provided. The main housing is formed with a cylindrical wall 16 providing a gear case having a circular pocket 17 to receive a worm gear wheel 18. This is mounted on a fixed spindle 19 carried in the side wall 20 of the cylindrical portion of the gear case. Formed integral with the cylindrical portion 16 of the main housing 15 is a bearing extension 21. This bearing extension is formed with a bearing bore 22 which receives a worm gear 23. The gear is disposed with its rotating axis at right angles to the rotating axis of the worm gear wheel 18. The gear 23 is mounted upon a driving spindle 13. The driving spindle 13 is suitably supported in anti-friction bearings 25 and 26. A bearing plug 27 may support the spindle to maintain it in alignment when the spindle is driven by the chuck 12. A cover plate 28 may be fastened over the end of the portion 21 and the bearing plug 27. The cover plate 28 is secured in place by cap screws 29. Formed integral with the cylindrical wall 16 and extending radially with relation to the axis of the spindle 13 is a tubular barrel 30. This barrel is cylindrical and communicates with the annular pocket 17. The longitudinal axis of the barrel is disposed radially of the axis of the worm wheel 18 and is also in the plane of the drive spindle 13 and parallel thereto. The outer end of the barrel 30 has an extension 31 of reduced diameter. Secured around the barrel is a split sleeve 32 which is formed with a pair of bolting flanges 33. Clamping screws 34 extend through these bolting flanges and tighten the sleeve in position therearound. The outer end of the sleeve 32 is formed with a reduced shoulder 35 within its bore to engage the shoulder formed at the outer end of the extension 31 of the barrel. The sleeve 32 carries a pair of longitudinally extending guide arms 36 and 37 which are disposed upon diametrically opposite sides of the longitudinal axis of the barrel and are fitted at their outer end with a bifurcated guide shoe 38. The guide shoe 38 has a toe 39 formed with a central slot 40 the opposite sides of which toe extend along opposite sides of a saw blade 45 beyond the sleeve and tend to guide the blade. A heel portion 41 is also formed on the shoe. Disposed in the slot 40 is the hacksaw blade 42. This blade extends beyond the end of the shoe 38 at its outer end and extends into a longitudinal slot 43 in a cylindrical plunger 44. The plunger 44 extends between the arcuate guide members 36 and 37 and is reciprocably mounted within the barrel 30. A threaded bore 45 is centered in the lower edge of the slot 43 and receives a socket screw 46 which when threaded into position engages the ⸺ge of the hacksaw 42 and grips it against the back face 47 of the slot 43. The portion of the plunger 44 which occurs within the barrel 30 and reciprocates therein has a sliding fit. The end of the plunger opposite to the slotted end 43 is formed with a slot 48. This slot is particularly shown in Fig. 5 of the drawings. The slot is of sufficient width to receive the end of a pitman rod 49 and to be held in position by a wrist pin 50, which forms a pivotal connection between the pitman rod and the plunger 44. The pitman rod 49 lies over the face of the worm gear wheel 18 and is engaged by a crank pin 51 which projects from the face of the worm gear wheel 18. It will thus be seen that the position of the slot 48 is off-center from the longitudinal center of the plunger, and that when the plunger is placed in position within the barrel the pitman rod may be swung to its assembled position upon the crank pin 51 by rotation of the plunger within the barrel. A nut 52 on the crank pin 51 holds the pitman rod in position. It is desirable to place a bushing 53 on the pin 51.

In operation of the present invention the structure is assembled as here shown. The tool 14 after being assembled, is connected to the chuck 12 by its spindle 13 so that when the portable motor unit 10 is driven the spindle 13 will rotate. This rotation will be imparted to the worm gear 23, which in turn will drive the worm wheel 18. At the present time the driving connection between the source of power and a saw head is in most tools at high speed. This makes it difficult for the tool to be controlled when moving along a kerf which it is cutting. It is also common practice in current designs of tools of this character that types of gears are used which are large in diameter and make it necessary to enclose them within heavy and bulky housings.

In the present structure attention is directed to the fact that a worm gear is used which will give any desired reduction in driving speed from the spindle 13 to the plunger 44, and that furthermore the use of worm gears makes it possible to enclose the gearing in a small and compact gear case or housing, as indicated at 15. It is also to be noted that since the housing is of relatively small size it may be designed so that the housing, the barrel and the bearing extension 21 may be made of a single piece of material. Furthermore, it will be evident that the pocket 17 within which the worm wheel 18 is enclosed may be conveniently packed with grease and closed by a cover plate 54 which is held by screws 55. An extension 56 on this cover plate seals an opening 57 in the barrel through which access may be had to the wrist pin screw 50. When the spindle 13 is being driven it will rotate the worm gear 23 and worm wheel 18 and will then act through the pitman rod 49 to reciprocate the plunger 44. In the event that a new saw blade is required blades may be easily interchanged by manipulating the socket set screw 46. It will be observed that the depth of penetration may be controlled by adjusting and setting the sleeve 32 at points along the barrel.

It will be understood that while the member 42 has been designated as a hacksaw blade it may be any desired reciprocating cutting or abrading member. Attention is directed to the fact that the present structure is designed so that it can be used in confined and otherwise inaccessible places, such for example as on work in airplane construction, where the device must operate in close quarters in sawing parts of wings, instrument panels, gas tubes, bomb bay doors, straps, hangers, and tubing in the fuselage. These operations require that the hacksaw structure shall be of small compass, and that its driving mechanism shall be longitudinally aligned with the saw so that the structure may be introduced into relatively small spaces.

It will thus be seen that the portable power hacksaw here disclosed is of a design which insures that the driving mechanism will be small and compact, and that it will be enclosed in a rigid housing of one-piece structure, insuring strength and lightness of weight, and further acting to hold all of the parts rigidly so that a minimum wear will take place in the operation.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A portable power hacksaw, comprising a tubular barrel, a plunger reciprocating therein, a guide for a hacksaw blade mounted on the barrel and projecting beyond the barrel and beyond the stroke of the plunger, a hacksaw blade detachably secured to said plunger at one end, the opposite end being free and reciprocating through said guide, a circular gear case formed integral with the barrel and lying with its central axis at right angles to the central axis of the barrel, a worm gear wheel in the gear case rotatably supported at right angles to the longitudinal center axis of the barrel, a worm gear in mesh therewith lying in the plane of the longitudinal axis of the barrel with its axis parallel thereto, and a spindle for driving said worm gear.

2. A device of the character described, comprising a housing formed with a relatively flat cylindrical gear case, a tubular barrel extending radially from the cylindrical wall of said gear case and being substantially of a diameter equal to the thickness of the gear case, an extension formed on said gear case, a driving spindle rotatably supported in said extension and extending with its axis at right angles to the axis of the cylinder, a worm gear mounted on said spindle, a worm wheel disposed within the cylindrical gear case and in mesh with said gear, a pivot for the wheel within the gear case, the aforesaid tubular barrel being formed integral with the cylindrical gear case and disposed with its axis parallel to the axis of the spindle and radially to the axis of the gear case, a cylindrical plunger mounted to reciprocate within said barrel, a hacksaw blade detachably secured by one end thereto, a driving connection between the plunger and the worm gear for imparting driving movement to the plunger, a sleeve mounted upon the barrel for longitudinal slidable adjustment, and a shoe carried at the outer end of said sleeve and formed with a guide slot through which the free end of the hacksaw blade is guided as it reciprocates with the plunger.

3. A device of the character described, comprising a housing formed with a relatively flat cylindrical gear case, a tubular barrel extending radially from the cylindrical wall of said gear case and being substantially of a diameter equal to the thickness of the gear case, an extension formed on said gear case, a driving spindle rotatably supported in said extension and extending with its axis at right angles to the axis of the cylinder, a worm gear mounted on said spindle, a worm wheel disposed within the cylindrical gear case and in mesh with said gear, a pivot for the wheel within the gear case, the aforesaid tubular barrel being formed integral with the cylindrical gear case and disposed with its axis parallel to the axis of the spindle and radially to the axis of the gear case, a cylindrical plunger mounted to reciprocate within said barrel, a hacksaw blade detachably secured by one end, a driving connection between the plunger and the worm gear for imparting driving movement to the plunger, a sleeve disposed upon the barrel for longitudinal adjustment, a pair of diametrically opposed longitudinally extending guide arms carried by the sleeve and projecting beyond the end of the barrel, said guide arms acting to guide the portion of the plunger which projects beyond the end of the barrel and its stroke, and a shoe carried at the outer ends of the guide arms and beyond the end of the stroke of the plunger, said shoe being split to receive the free end of the blade and to guide the same in its reciprocation.

4. A portable power hacksaw, comprising a gear case, a tubular barrel extending therefrom, a cylindrical plunger reciprocating in said barrel and projecting beyond the outer end thereof on its outward stroke, an abrading blade secured by one end to the end of the plunger and extending longitudinally therefrom, and a pair of arcuate guide arms extending longitudinally beyond the end of the barrel and conforming with the outer circumference of the plunger whereby to guide the same.

5. The structure of claim 4 including a shoe connecting the outer ends of said arms and formed with a guide slot through which the hacksaw blade may reciprocate.

6. A power hacksaw, comprising a housing having a cylindrical relatively flat main portion, a tubular barrel formed integral therewith and disposed with its longitudinal center radially of the axis of said cylindrical housing and being of an outside diameter substantially agreeing with the thickness of said cylindrical housing, a bearing structure formed as a part of said housing and extending upon the opposite side from the tubular barrel, the axis of said bearing structure being in the plane of the tubular barrel and parallel thereto, a worm wheel rotatably mounted within the cylindrical housing, a worm gear in mesh therewith and disposed in the bearing structure, a drive shaft rotatably supported in the bearing structure and carrying the worm gear at its forward end, a plunger extending through the tubular barrel and reciprocating therein, a pitman rod connecting the plunger with the worm wheel to reciprocate the same, a slotted seat in the projecting end of said plunger, a hacksaw blade extending into said seat at one end, means for clamping the blade in position to hold it with its outer portion extending free, and a longitudinally adjustable guide mounted upon said barrel, said guide having a portion extending beyond the end of the plunger and straddling the free end of the hacksaw blade to guide the same.

OSCAR REDENBO.